(No Model.)

G. H. HAZELTON.
TEA OR SUGAR CADDY.

No. 313,666. Patented Mar. 10, 1885.

Witnesses
S. N. Piper
Ernest B. Pratt

Inventor.
Geo. H. Hazelton.
by R. H. Eddy atty.

United States Patent Office.

GEORGE HENRY HAZELTON, OF BOSTON, MASSACHUSETTS.

TEA OR SUGAR CADDY.

SPECIFICATION forming part of Letters Patent No. 313,666, dated March 10, 1885.

Application filed January 29, 1885. (No model.)

*To all whom it may concern:*

Be it known that I, GEORGE HENRY HAZELTON, of Boston, in the county of Suffolk, of the Commonwealth of Massachusetts, have invented a new and useful Improvement in Tea or Sugar Caddies; and I do hereby declare the same to be described in the following specification, and represented in the accompanying drawings, of which—

Figure 1:
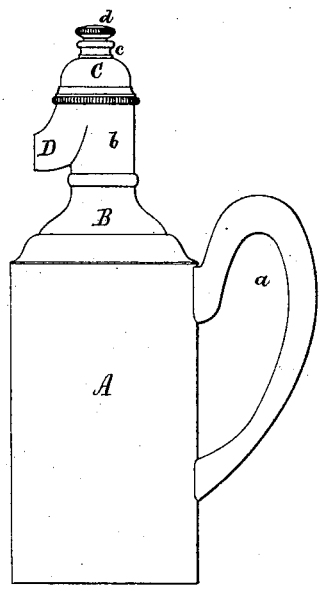
Figure 2:
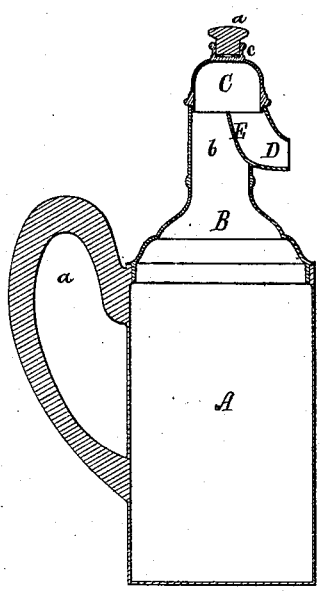

Figure 1 is a side elevation, and Fig. 2 a vertical section, of a caddy of my invention, the nature of which is defined in the claims hereinafter presented.

Such caddy is to hold tea or sugar and deliver such in like or measured quantities into a cup or vessel—as, for instance, a tea-spoonful, or thereabout, at each delivery—it being a rule with housewives in charging a tea-pot with tea to put into it a number of tea-spoonfuls thereof which shall exceed by one the number of persons to be served with the infusion. So, in sweetening a cup of tea or coffee, one or more tea-spoonfuls of sugar are generally thrown into the cup.

In the drawings, A denotes a pot, can, or vessel provided with a handle, a, and at top with an opening or mouth. Into the said mouth of such vessel there is inserted or screwed a mouth-piece or inverted tunnel, B, having its neck *b* surmouted by a measuring dome or cap, C, which, as represented, is separable from the mouth of the stem. I usually have it to fit closely or screw into the stem. Leading down from the neck at an inclination thereto and opening out of it is an educt or nose, D, and extending upward within the neck at the lower part of the bore of the educt to or about to the top of the neck, is an inclined partition, E, that goes across the bore of the neck. The dome C at its top is provided with a socketed projection, *c*, to receive and hold a plug, *d*, to fit into the nose at its discharging end. I sometimes have the mouth-piece of the tunnel to constitute the top of the can, in which case the neck I make separable from the mouth-piece.

To use the caddy when charged with tea or sugar, it is first to be inverted or turned bottom upward, so as to cause the tea or sugar to run into and fill the dome. This having been done, the nose is to be held over a cup or tea-pot, and the caddy should be turned upward to allow to pass through and out of the nose the part of the tea or sugar that may be directly over the partition, the portion that may be in rear of the partition falling at the same time down into the vessel A. The tunnel serves to guide the material into the dome when the caddy is in the act of being turned to fill such dome with the sugar or tea. By having the dome separable from the tunnel, and the latter from the pot or vessel A, either of them, in case of tea or sugar becoming slowly packed in it, so as not to be readily ejected from it through the nose, can be easily removed from the part to which it may be directly connected and be cleansed, or have the material on it loosened or removed from it.

It will be evident that instead of tea or sugar any other matter in a powdered state can be used in the caddy.

I claim—

1. In the caddy, the combination of the measuring-dome with the tubular neck, and the nose and partition arranged with such neck, as represented.

2. The combination of the can with the tubular neck provided with the nose and partition, and with the measuring-dome surmounting such neck, all being substantially as set forth.

3. The combination of the open-mouthed vessel A with the inverted tunnel B, the partition E, nose D, and the measuring dome or cap C, arranged substantially as set forth.

4. The measuring dome or cap C, provided with the nose-plug-receiving socket, in combination with the can, having to its discharging-neck the partition and nose, as described, such dome being arranged with such neck, nose, and partition, substantially as represented.

GEORGE HENRY HAZELTON.

Witnesses:
 R. H. EDDY,
 ERNEST B. PRATT.